Oct. 31, 1950 — M. I. NAPPER — 2,528,386
MECHANICAL MOVEMENT FOR THE CONVERSION OF RECIPROCATING AND ROTARY MOTION
Filed July 15, 1949 — 3 Sheets-Sheet 1

Mannie I. Napper
INVENTOR.

BY *Clarence A. O'Brien and Harvey B. Jackson*
Attorneys

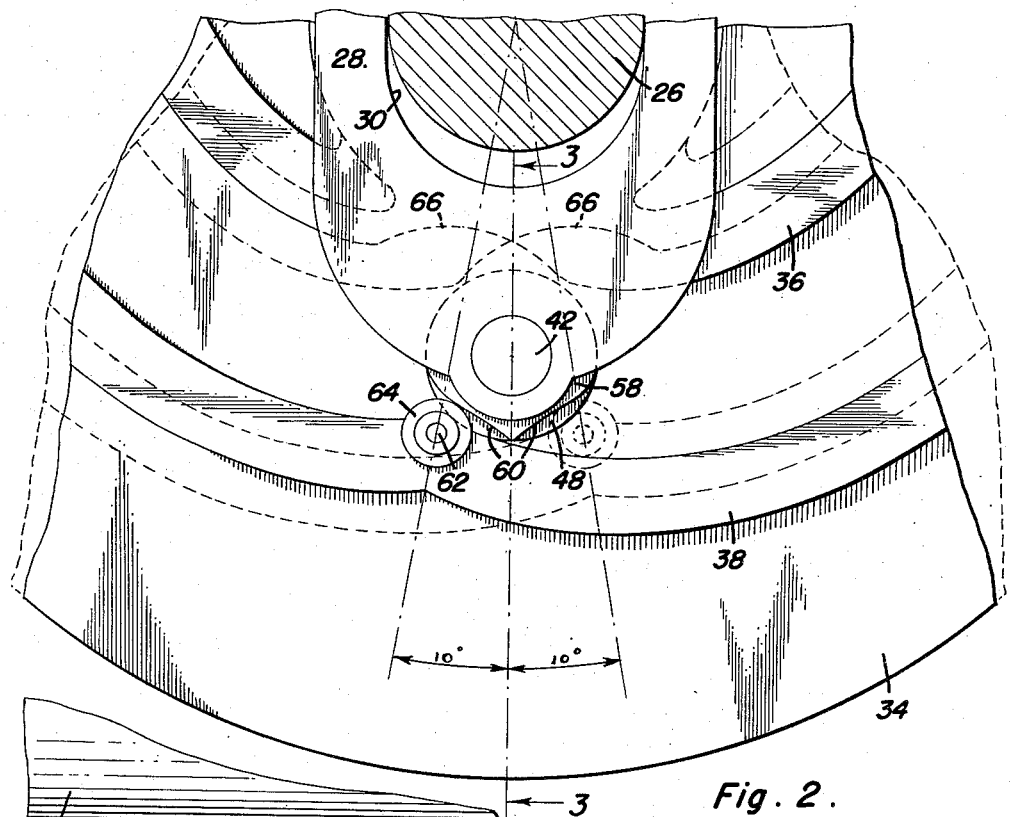
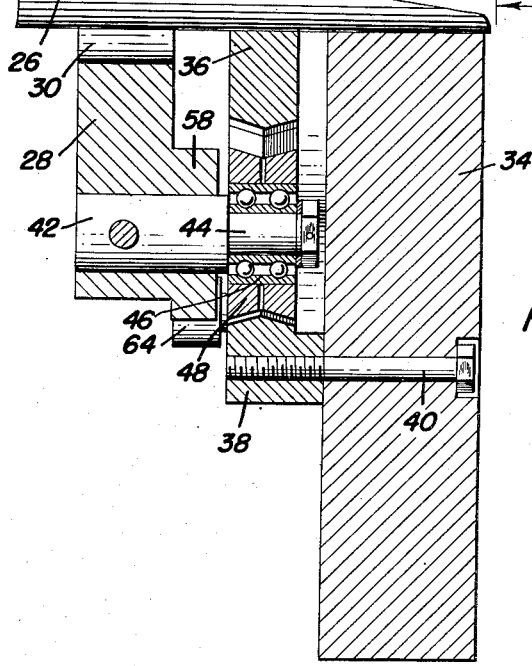

Oct. 31, 1950     M. I. NAPPER     2,528,386
MECHANICAL MOVEMENT FOR THE CONVERSION OF
RECIPROCATING AND ROTARY MOTION

Filed July 15, 1949     3 Sheets-Sheet 3

Mannie I. Napper
INVENTOR.

Patented Oct. 31, 1950

2,528,386

UNITED STATES PATENT OFFICE 2,528,386

MECHANICAL MOVEMENT FOR THE CONVERSION OF RECIPROCATING AND ROTARY MOTION

Mannie I. Napper, Boise, Idaho

Application July 15, 1949, Serial No. 104,912

7 Claims. (Cl. 74—55)

This invention comprises novel and useful improvements in a mechanical movement for converting reciprocating to rotary motion and more specifically pertains to a mechanical movement for providing a more effective application of power from a reciprocating member to a rotary member throughout the entire angular rotation of the latter and particularly with reference to the dead center positions of the reciprocating member.

A primary object of this invention is to provide an improved and more efficient mechanical movement for the conversion of reciprocating to rotary motion, and particularly to such a mechanism in which a plurality of reciprocations of a reciprocating member are effected in response to a single rotation of the rotatable member.

There have been heretofore known mechanical movements in which a reciprocating slide has been connected to the cam track of a rotatable member in such a manner as to effect a plurality of reciprocations of the slide for each rotation of the rotatable member. Such mechanisms however have inherently possessed the defect that as the slide reverses its direction of movement in each reciprocation, and approaches a dead center position, the leverage exerted by the slide upon the cam track diminishes to a minimum, whereby the efficiency of power transmission is greatly curtailed. Accordingly, it is the fundamental aim of this invention to provide in a mechanical movement of this character, auxiliary means connecting the slide with the cam member for increasing the effective leverage of the cam member and the slide to thereby augment the transmission of power during the so-called dead center positions of the mechanism.

A further important feature of the invention is to provide a mechanism of the character set forth hereinbefore which will readily lend itself for such specialized uses as the transmission of power in engines, compressors, pumps, and the like, as well as in all applications where motion is to be transferred between rotating and reciprocating members.

These, together with various ancillary features and objects of the invention are attained by the present invention, preferred embodiments of which have been illustrated in the accompanying drawings and which are to be regarded as illustrative of the fundamental principles of the invention rather than as limitations thereof, like numerals being employed for similar parts throughout the accompanying drawings wherein:

Figure 2 is an enlarged fragmentary detail view of a portion of the mechanical movement, the same being displaced ten degrees of shaft rotation from the position shown in Figure 1, and illustrating more clearly the construction and operation of the auxiliary cam mechanism of the invention;

Figure 3 is a fragmentary vertical transverse sectional detail view through the mechanism of Figure 2 and is taken substantially upon the plane of the section line 3—3 thereof;

Figure 4:
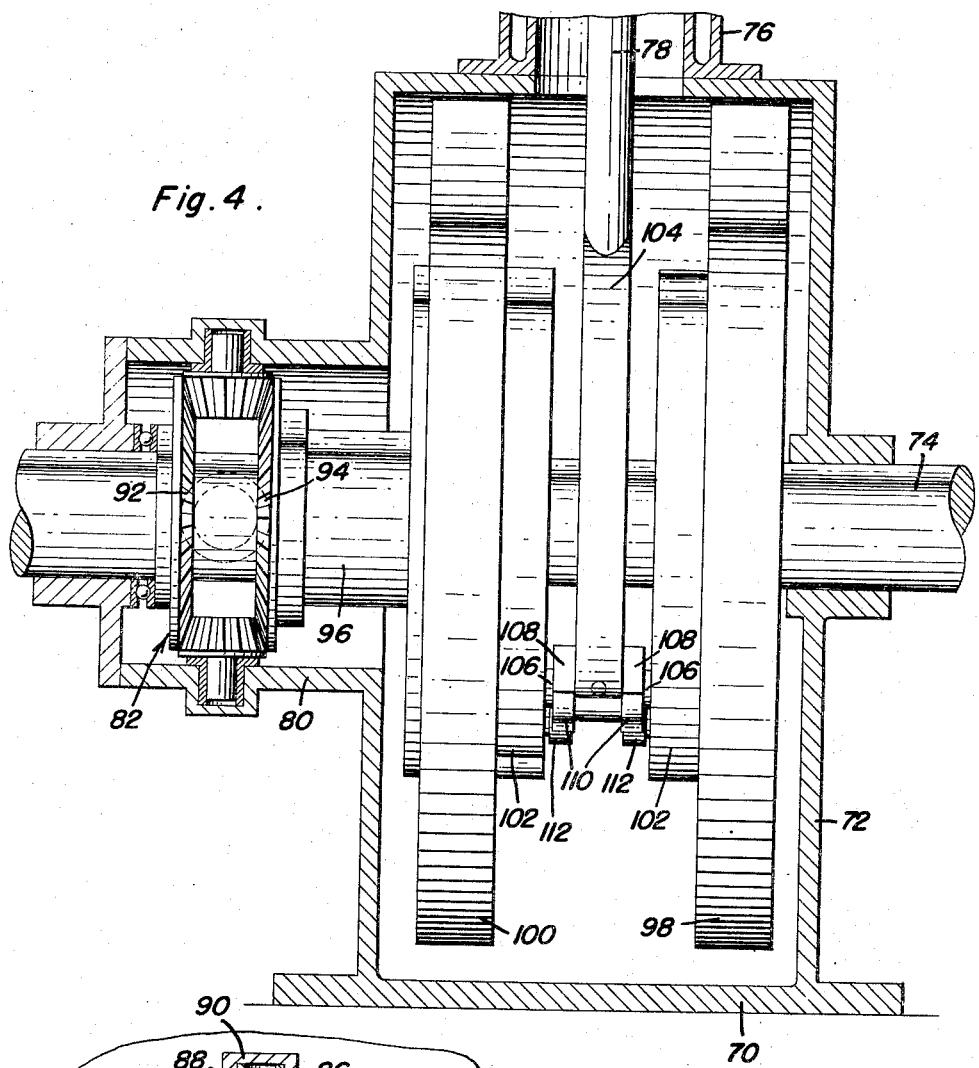
Figure 5:
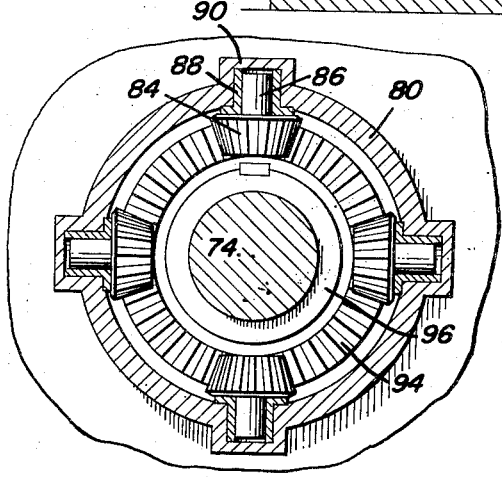

Figure 4 is a vertical longitudinal sectional view through a modification in accordance with the principles of the invention, disclosing a means for balancing the reaction of the cam follower of the mechanism upon the cam surface and thus converting the side thrust to useful energy; and Figure 5 is a fragmentary vertical transverse sectional detail view taken through the differential gearing of a portion of the mechanism of Figure 4.

Figure 1:
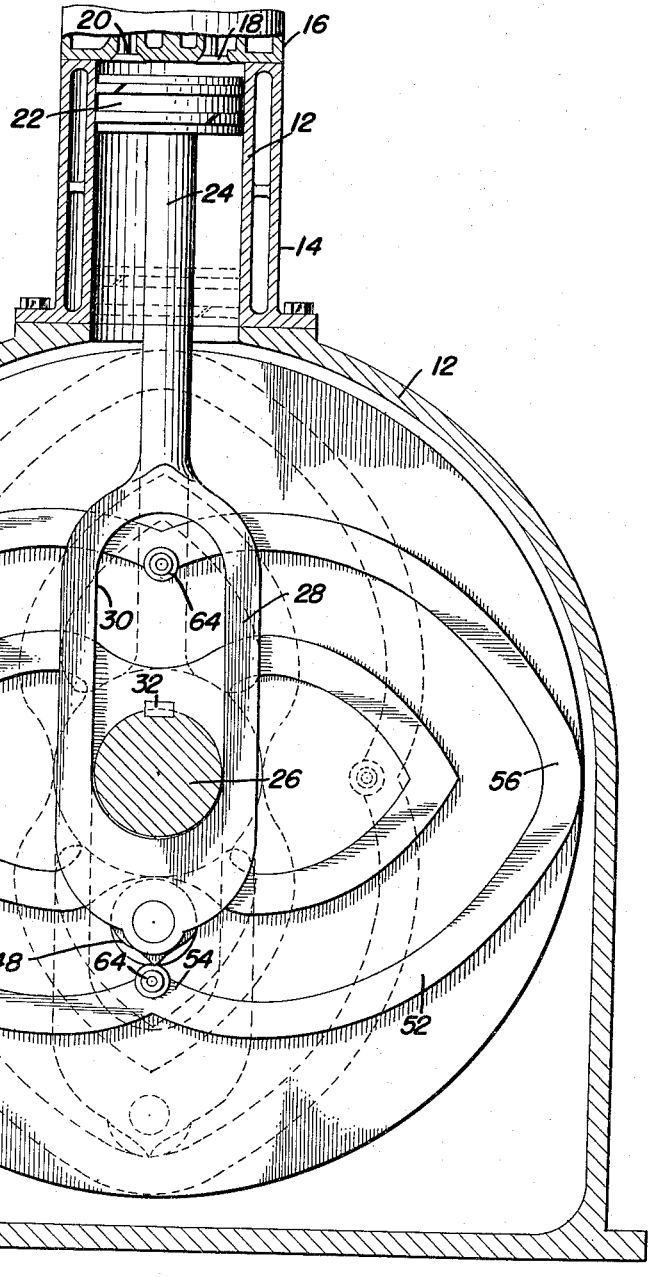
Figure 1 is a vertical transverse sectional view through one embodiment of an apparatus in accordance with the principles of this invention, alternative position of the parts at an interval of ninety degrees of rotation from the solid line showing being indicated in dotted lines therein.

Referring now more particularly to Figures 1-3 of the accompanying drawings, which may be regarded as illustrating the primary and basic features of this invention, the numeral 10 indicates a supporting base of any suitable type which is provided with a transmission casing 12 upon which is detachably mounted a guide 12 which if desired may be the cylinder of an internal combustion engine, a pump or the like, and which may be provided with a customary cooling jacket 14, and with a removable cylinder head 16 provided with the conventional valves 18 and 20. Guided for reciprocation within the cylinder 12 is a slide which may consist of a piston 22 of more-or-less conventional construction, and which is preferably provided with a connecting rod 24 which may be rigidly attached to the piston if desired, and which is connected by a mechanism to be subsequently described with a rotatable shaft 26 which is suitably journaled in the casing 12.

Although the cylinder 12 of an engine or pump has been chosen and illustrated to facilitate understanding of the application of the principles of the invention, it should be understood that in its broadest aspect, the invention is applicable to any slide 22 which is of a reciprocating nature, and which is to be connected to a rotatable shaft 26 for conversion of motion and power therebetween, it being understood that the cylinder 14 thus functions as a guide for the slide.

Referring now more particularly to Figures 1 and 2, it will be seen that the connecting rod 24 is at its lower end provided with a yoke 28 having a hollow portion 30 which receives the shaft 26 whereby the yoke and consequently connecting rod and piston may be reciprocated radially with respect to the shaft 26, the opening 30 of the yoke 28 thus serving to guide the lower end of the connecting rod 24, while the piston 22 guides the upper end thereof, and thus confines the connecting rod and piston to rectilinear reciprocation radially of the shaft 26.

Mounted upon the shaft 26 and rigidly secured thereto for rotation therewith in any suitable manner as by a key or spline 32, is a disk 34 provided with a cam track to which the yoke 28 of the slide or piston 22 is operatively connected.

This cam track may be secured in any desired manner to the cam disk 34, and may even be formed as an integral rib or groove on the disk. However, it may satisfactorily be formed as concentric inner and outer members 36 and 38 which are removably secured to the disk 34 as by fastening bolts 40, and which are radially spaced from each other to provide a sinuous cam track between the adjacent edges of the members 36 and 38. The yoke 28 at its lower end is provided with a laterally extending pin or shaft 42, terminating in a pintle 44 of reduced diameter for receiving an anti-friction bearing such as a roller bearing 46 which thereby journals a roller 48 constituting a cam follower and which rides in the cam track between the members 36 and 38.

The roller and cam track may be provided with various contours as expediency dictates; and a satisfactory arrangement is that shown in Figure 3 wherein the adjacent surfaces of the members 36 and 38 of the cam track each consist of a pair of inclined cam surfaces which are engaged by oppositely inclined frusto-conical surfaces of the roller 48, whereby the latter is retained and guided for rolling movement upon the lower or upper surfaces of the cam track.

As so far described, it will thus be seen that there has been provided a conventional form of cam and follower for connecting the rectilinearly reciprocating slide and connecting rod with the rotating cam track.

Preferably this cam track is contoured to provide a plurality of sets or pairs of cam reaches, each set of reaches consisting of adjacent cam track portions 50 and 52 which merge at a point 54 providing an upper dead center position for the mechanical movement, while adjacent sets of reaches merge as at 56, to provide lower dead center positions for the mechanism.

There has been illustrated for simplicity a cam including four reaches or two sets of cam reaches, whereby four strokes or two complete reciprocations of the slide 22 and connecting rod 24 are effected during each revolution of the shaft 26. However, it is to be understood that any desired number of pairs or sets of reaches could be provided, to thereby produce any desired number of reciprocations of the slide for each revolution of the shaft.

It will be noted that in the mechanism as so far described, the slide and connecting rod will at their upper end lower positions, known as top dead center and bottom dead center positions, exert the minimum or zero leverage or turning movement upon the effective crank arm of the cam and shaft mechanism. The mechanism forming the basis of this invention is provided to augment the turning moment at these two positions.

For this purpose, as shown best in Figures 2 and 3, the yoke 28 is provided with a laterally extending bolt or lug 58 which is provided with depending and converging cam surfaces 60. The lug 58 and cam surfaces 60 are interposed between the yoke 28 and the cam track members 36 and 38.

Journaled on a pin or stub axle 62 extending laterally from the disk 34 or the cam track member 38, is an anti-friction roller 64 which extends radially inwardly from the outer cam surface of the cam track member 38 and which is positioned at the top dead center position of the same and in the path of travel of the cam surfaces 60 of the lug 58. Obviously, these cam surfaces 60 may extend through any desired arc or portion of the rotation of the cam track desired, but it has been found to be satisfactory to employ each cam surface 60 through an arc represented by about ten degrees of rotation of the cam track from either side of its dead center position.

The roller 64 and the cam surfaces 60 thus define an auxiliary cam follower means which are intermittently engaged throughout a relatively minor portion of the rotation of the cam member, as for example throughout about twenty degrees of rotation of the same, whereby during this relatively short period of travel during the dead center position, the power is transmitted from the reciprocating slide 22 to the rotating shaft 26 and vice versa through the engagement of the roller 64 upon the cam surfaces 60, while throughout the rest or major portion of rotation, the power is transmitted through engagement of the roller 48 with the cam track of the members 36 and 38.

It should be here noted that these auxiliary cam follower rollers 64 are positioned at each of the top dead center positions of the plurality of sets of cam reaches, whereby their auxiliary driving effect may be employed at each top dead center position.

As will be apparent from Figure 2, it will be seen that when during the rotation of the cam track, the driving roller 48 approaches the top dead center positions 54 thereof, that at about ten degrees prior to this dead center position, one of the cam surfaces 60, depending upon the direction of rotation, will engage the auxiliary roller 64, and due to the slope or incline of the cam surface 60, the radial thrust of the reciprocating slide will be imparted to the roller 64 in a direction which is offset from a radial line of reciprocation of the slide, whereby a positive side thrust is imparted to the cam member and disk 34, thereby providing an effective lever arm to positively apply torque or power from the slide to the cam at the top dead center position of the slide. As the cam surfaces 60 pass over the top dead center position, the receding surface 60 now engages the roller 64 for the transfer of motion and power therebetween. It should be noted that in advance of and after the ten degree period from the top dead center position, that the main driving roller 48 will engage the cam track at an effective angle to continue the transmission of power and motion between the reciprocating and rotary members.

It will be further noted by reference to Figure 2 that as the cam surfaces 60 engage the roller 64, the main rollers 48 or cam followers, will be lifted above the cam track for the member 38, and consequently the cam track with the member 36 is cut away as indicated in dotted lines at 66 to provide the necessary clearance for this movement of the roller 48.

It will be noted that when the rotation of the cam member is drawing the slide and roller 48 downwardly, the latter will engage the cam track upon the member 36; while when the cam drives the slide upwardly, the cam track of the member 38 will be in operative engagement with the roller.

Reference is now made to the embodiment of Figures 4 and 5 for illustrating a further manner in which the principles of the invention illustrated in Figures 1–3 may be applied and in which the side thrust of the driving roller of the slide may be converted into useful work while balancing the side thrust upon the mechanism.

In this embodiment, a supporting base 70 is provided with a casing 72 in which is journaled a driving shaft 74 and upon which is detachably mounted a guide which may be in the form of a cylinder 76 for the reception of a slide in the form of a piston, not shown, but which may be of the same construction as that shown in Figures 1–3, and which is provided with a connecting rod 78.

The casing 72 at one side is provided with a laterally extending gear casing 80 through which the shaft 74 extends, and a differential gearing assembly 82 of a known design, and which consists of idler or spider gears 84, each having a stub axle 86 journaled in a radially positioned bushing 88 in bearing sockets 90 of the casing 80, are provided. These idler gears are each in continuous mesh with a pair of bevel gears 92 and 94 which are respectively keyed or otherwise non-rotatably attached to the axle 74 and to a sleeve 96 which is journaled and freely rotatable thereon.

A pair of cam disks 98 and 100 are respectively rigidly attached to and carried by the shaft 74 and the sleeve 96, and these disks are provided with cam track members 102 which are of identical construction and which are preferably formed in the same manner as the cam track members referred to in the description of Figures 1–3.

The connecting rod 78 likewise terminates in a yoke member 104 which may be identical with the yoke member 28, and which straddles and is guided for radial movement upon the shaft 74. The yoke 104 is provided with a pair of laterally extending pins 106 which are identical with the pins 42 of Figure 2 and are provided with driving rollers for engagement with the cam members 102 in the same manner as set forth in the preceding embodiment. Further, the yoke 104 is provided with laterally extending lugs 108 on opposite sides thereof, which lugs terminate in cam surfaces 110. The lugs 108 and cam surfaces 110 are likewise identical with the lugs 58 and cam surfaces 60 of the preceding embodiment. Finally, the cam members 102 are provided with rollers 112 which cooperate with the cam surfaces 110 in the same manner as the corresponding parts of the preceding embodiment.

In this arrangement, the reciprocation of the slide, connecting rod 78 and yoke 104, causes the main driving rollers to engage the two cams 102 and drive the same in opposite directions, whereby the shafts 74 and 96 rotate oppositely, being connected for the exchange of power and rotation therebetween by the differential gearing 82.

It will thus be seen that the side thrust of the connecting rod 78 and yoke 104 upon one cam 102 is balanced by the corresponding opposite thrust upon the other cam 102, of the opposite rotating shafts 74 and 96, whereby the reactions of the two driven members are equal and opposite, thus counterbalancing each other, and whereby the driving thrust and the reaction are both utilized for imparting power through the differential gearing to the shaft 74.

In this arrangement, the auxiliary cam mechanism serves to amplify or enhance the power transmitted from the slide to the rotating shaft during the passage of dead center positions of the mechanism.

From the foregoing, the construction and operation of the device will be readily understood together with the principles and advantages thereof, and accordingly further explanation is believed to be unnecessary.

However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A mechanical movement for converting reciprocating motion to rotary motion comprising a rotatable shaft having a disk fixed thereto, a cam track on said disk, a reciprocating slide, a connecting member secured to said slide and to said cam track, said cam track having a plurality of sets of reaches, each set comprising a pair of reaches for causing one reciprocation of said slide, a cam follower on said connecting member engaging said track, an anti-friction bearing at the dead-center position of each set of reaches for engagement by said connecting member.

2. The combination of claim 1 wherein said cam follower comprises a roller journaled on said connecting member and riding on said cam track.

3. A mechanical movement for converting reciprocating motion to rotary motion comprising a rotatable shaft having a disk fixed thereto, a cam track on said disk, a reciprocating slide, a connecting member secured to said slide and to said cam track, said cam track having a plurality of sets of reaches, each set comprising a pair of reaches for causing one reciprocation of said slide, a cam follower on said connecting member engaging said track, an anti-friction bearing at the dead-center position of each set of reaches for engagement by said connecting member, said anti-friction bearing comprising a roller journaled on said cam track and an auxiliary cam surface on said connecting means for engagement with said anti-friction bearing.

4. The combination of claim 3 wherein said cam follower comprises a roller journaled on said connecting member and riding on said cam track.

5. The combination of claim 4 wherein said cam surface is disposed on said connecting member laterally of said cam follower and said anti-friction bearing is disposed laterally of said cam track.

6. The combination of claim 3 wherein said cam surface extends throughout not more than 20° of cam track rotation.

7. In a mechanical movement having a reciprocating slide and a rotatable cam track consisting of a plurality of pairs of cam reaches for each producing a reciprocation of said slide, means connecting said slide to said cam track transmitting power and motion therebetween throughout the major portion of each pair of reaches and auxiliary means connecting said cam track with said slide for increasing the crank angle of the slide and cam track throughout a dead center portion of each pair of reaches, said last means comprising inclined, convergent cam surfaces on said slide and an anti-friction roller journaled on said cam track for intermittent engagement by said roller.

MANNIE I. NAPPER.

REFERENCES CITED

The following references are of record in the file of this patent:

UNITED STATES PATENTS

| Number | Name | Date |
|---|---|---|
| 2,086,835 | Adkinson et al. | July 13, 1937 |
| 2,407,859 | Wilson | Sept. 17, 1946 |
| 2,445,902 | Bell | July 27, 1948 |